US012776922B2

(12) United States Patent
Poosamani

(10) Patent No.: US 12,776,922 B2
(45) Date of Patent: Oct. 27, 2026

(54) PROVIDING USER ID INFORMATION STORED IN A SECURE AREA OF A MOBILE DEVICE

(71) Applicant: Samsung Electronics Co., Ltd., Suwon-si (KR)

(72) Inventor: Nithyananthan Poosamani, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 18/810,926

(22) Filed: Aug. 21, 2024

(65) Prior Publication Data

US 2025/0119302 A1 Apr. 10, 2025

Related U.S. Application Data

(60) Provisional application No. 63/542,431, filed on Oct. 4, 2023.

(51) Int. Cl.
*H04L 9/32* (2006.01)

(52) U.S. Cl.
CPC .......... *H04L 9/3265* (2013.01); *H04L 9/3231* (2013.01)

(58) Field of Classification Search
CPC ............................ H04L 9/3265; H04L 9/3231
See application file for complete search history.

(56) References Cited

U.S. PATENT DOCUMENTS

| | | | | |
|---|---|---|---|---|
| 9,521,248 B2 | 12/2016 | Kobayashi | | |
| 10,691,191 B2 | 6/2020 | Sundaramurthy | | |
| 11,093,207 B1 | 8/2021 | Lovelock | | |
| 11,704,761 B2 | 7/2023 | Bloy | | |
| 11,770,369 B2 | 9/2023 | Shastry | | |
| 2006/0135065 A1* | 6/2006 | Lee | H04W 12/50 | 455/41.1 |
| 2011/0300829 A1 | 12/2011 | Nurmi | | |
| 2013/0283199 A1 | 10/2013 | Selig | | |
| 2014/0215206 A1* | 7/2014 | Courtney | H04W 12/043 | 713/156 |
| 2014/0289511 A1* | 9/2014 | Tuch | H04L 63/0272 | 713/156 |

(Continued)

FOREIGN PATENT DOCUMENTS

| | | | |
|---|---|---|---|
| CN | 114143034 A * | 3/2022 | H04L 9/3268 |
| WO | WO-2024206361 A1 * | 10/2024 | H04W 12/069 |

*Primary Examiner* — Ayoub Alata

(57) ABSTRACT

In one embodiment, a method includes receiving, at a mobile device of a user and from a server device having a database of trusted reader devices, one or more trusted reader root certificates, each pertaining to one or more particular trusted reader devices. The method further includes receiving, at the mobile device, a request from an external device to provide information regarding the user's identity, wherein this information is stored in a secure hardware portion of the mobile device; receiving, at the mobile device, a certificate chain from the requesting external device; evaluating the received certificate chain relative to one or more trusted reader root certificates; and in response to a determination that the received certificate chain matches a trusted reader root certificates, then granting, to a trusted application on the mobile device, access to the information regarding the user's identity.

20 Claims, 4 Drawing Sheets

(56) References Cited

U.S. PATENT DOCUMENTS

| | | | | |
|---|---|---|---|---|
| 2015/0327208 | A1* | 11/2015 | Qiu | H04W 4/02 455/456.1 |
| 2018/0007500 | A1* | 1/2018 | Kinoshita | H04W 8/005 |
| 2019/0354665 | A1 | 11/2019 | Haslam | |
| 2021/0377742 | A1 | 12/2021 | Boyd | |
| 2023/0020703 | A1 | 1/2023 | Padinjaruveetil | |
| 2023/0088625 | A1 | 3/2023 | Yun | |
| 2023/0254311 | A1 | 8/2023 | Huffman | |
| 2023/0259602 | A1 | 8/2023 | Anwar | |

* cited by examiner

PROVIDING USER ID INFORMATION STORED IN A SECURE AREA OF A MOBILE DEVICE

PRIORITY CLAIM

This application claims the benefit under 35 U.S.C. § 119 of U.S. Provisional Patent Application No. 63/542,431 filed Oct. 4, 2023, which is incorporated by reference herein.

TECHNICAL FIELD

This application generally relates to providing user ID information stored in a secure area of a mobile device.

BACKGROUND

A person's sensitive information is increasingly stored on electronic devices. For example, a user's financial information (e.g., credit card or debit card information) can be stored in a mobile device, and a secure application (often referred to as a "wallet" application) can access the financial information in the course of providing the information to an external device (e.g., to a credit-card reader).

A person's sensitive, personally identifying information can also be stored electronically. For example, a digital copy of a user's driver's license, state or student ID card, business ID card, passport, or other identifying card, document, certificate, license, accreditation, or credential, etc., may be stored on a mobile device. Here, the digital copy is not merely a photograph of the user's card or document, but rather is a digital version of the card or document that is credentialed, encrypted, and certified by a digital signature from the issuing authority. For example, a digital driver's license is a digital version of a physical driver license or state ID (or any physical ID), and can be issued or provisioned onto a mobile device by the relevant issuing authority (e.g., the state or country). Once provisioned onto a user's device, a digital driver's license can have the same legal status as a physical driver's license. Similarly, a digital ID issued by an entity such as a university or a business can have the same rights and privileges as physical IDs issued by such entities.

DESCRIPTION OF EXAMPLE EMBODIMENTS

Figure 1:
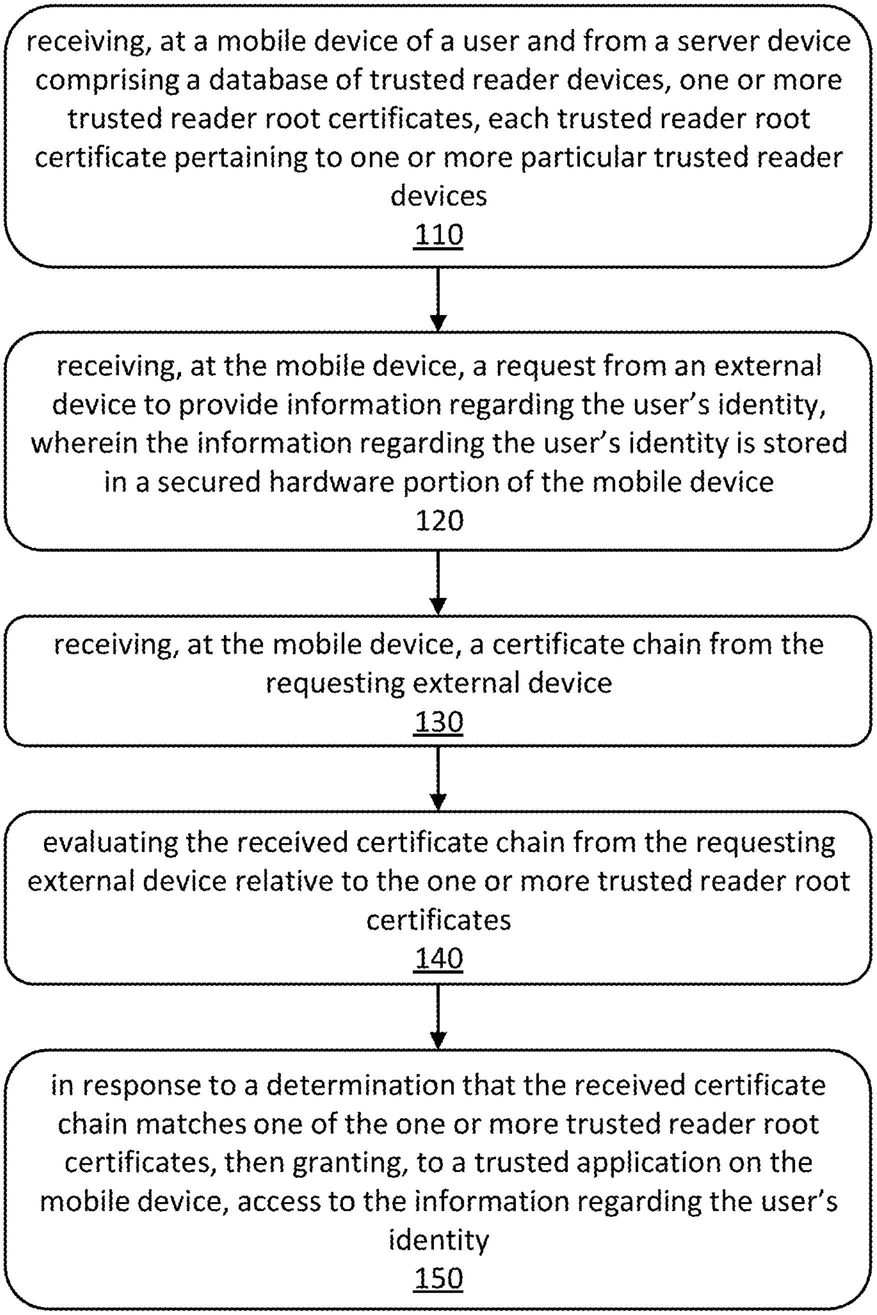
FIG. 1 illustrates an example method for verifying a request for a user's secure identifying information.

Secure personal information, such as a digital ID, is provisioned to a mobile device and stored on a secure hardware portion of that mobile device. The secure hardware portion is separate from the main hardware portions (e.g., the memory of the secure hardware portion is separate from the main volatile and non-volatile memory of the mobile device), and therefore the secure hardware portion is not accessible by most applications or hardware on the mobile device. Instead, the secure hardware portion is only accessible by trusted application(s) and trusted hardware on the device that have special access permission. For example, a wallet application may be a trusted application provisioned by the provider of the mobile device and granted access to the secure hardware portion of the mobile, e.g., through a separate, trusted processor and related memory structure that is granted access to the secure hardware portion.

In particular embodiments, the secure hardware portion and the information it contains is not accessible by the main processors (e.g., main CPUs and GPUs) of the mobile device or most of the applications executing on the mobile, including, in some embodiments, even the operating system running on the mobile device. The secured, isolated hardware portion of the mobile device may be referred to as "eSE" or "Enhanced Secure Element," among many other names (e.g., TrustZone) and the digital keys to encrypt or decrypt the data securely stored in this area cannot be tampered with, and the secured area is not susceptible to man-in-the-middle or other saturation attacks. In particular embodiments, a trusted application may require a user to authenticate themselves (e.g., by using a biometric sensor on the mobile device) in order to access the information in the secure hardware portion of the device.

Storage and provisioning of secure information, such as a mobile driver's license, can be determined according to standards established by the relevant industry. Provisioning refers to the act of uploading and storing the secure information on the mobile device. As an example, the Department of Motor Vehicles (DMV) in a particular state or an equivalent government entity has the source of truth (which may be called a system of record or "SOR") of all the individuals who have obtained a driver's license or a state ID in that state. The DMV can issue a digital equivalent of the physical forms of identification, via a verified and trusted electronic process, and the DMV is therefore the "issuing authority" of those credentials. Computing device(s) to which digital ID credentials are issued become the ID holder(s). A provisioning process can include scanning a physical document of record, performing a real-time or liveness check of the person within a view of a device's camera, and verification of information and submission to the issuing authority for adjudication and approval. After approval, a digital version of the ID credential and a payload called Mobile Security Object (MSO) is safely stored within the trusted, secured hardware storage space that is inaccessible by non-trusted components and processes of the communication device.

While the example above relates to provisioning an ID from a government agency (e.g., for a state-issued ID or a passport), this disclosure contemplates that identification credentials can issue from other sources (e.g., schools, business, associations, etc.). Provisioning of this information may be similar to the example described above. For instance, a provisioning process for digital ID information may begin by determining whether a computing device that will store the credentials contains the trusted application/secured hardware infrastructure. If so, then the enrollment process begins, which may include capturing information verifying the user (e.g., through documents or in-person processes). Some remote enrollment processes may include a liveness detection feature, which ensures that a person is visible in an image or video feed captured by the computing device, e.g., by determining whether the image or video feed contains human like features (e.g., based on facial landmarks) and/or human-like movements (e.g., eye blinking). An enrollment process may then include one or more notification verification (e.g., having the user and/or the issuing authority, or both, verify the process), and if that step is successful, then the credentials may be provisioned.

In particular embodiments, the format of how a digital ID credential is stored in the eSE is based on the mDOC standard as represented in ISO 18013-5, and the interaction between the ID-holding computing device and a reading device (which requests user-identifying information from the computing device) is governed by the ISO 18013-5 standard.

Once credentialed ID information is provisioned to an ID-holding computing device, the user of the computing device can share their credentialed ID information with any verified reader or terminal (which may be referred to herein as an "external device") that requests ID information from the user. For example, an external device can be an NFC or QR-code reader, e.g., a terminal at an airport checkpoint or other security checkpoint (e.g., to access a secured area of a business, of a medical facility, of a government facility, etc.). These external devices are examples of in-person transactions in which the user whose ID information is being requested is in the physical vicinity of the external device requesting the information. Another example is online transactions, in which an external device (e.g., a server device or other computing device) requests ID information from a user over a network channel, such as over the internet. For example, a user attempting to rent a car may need to verify that they have a valid driver's license, a user attempting to buy alcohol may need to verify their age, and a user attempting to withdraw money from a bank account may need to verify that they are one of the verified account holders.

FIG. 1 illustrates an example method for verifying a request for a user's secure identifying information. Step 110 of the example method of FIG. 1 includes receiving, at a mobile device of a user and from a server device that includes a database of trusted reader devices, one or more trusted reader root certificates, each trusted reader root certificate pertaining to one or more particular trusted reader devices. The mobile device can be any suitable mobile device, such as a smartphone, a smartwatch, a tablet, a laptop, a head-worn computing device, etc.

A backend server registers reader devices as a condition of providing service to the reader device (which can be any external device) through a trusted application, e.g., through a wallet application on the mobile device. The backend server and the trusted application make up an ecosystem or platform that manages the trusted application and the secure information; in many instances, the same entity (e.g. Samsung) manages the backend server, the trusted application, and the creation/distribution of the mobile device and its secured hardware, providing a coherent and secure approach.

First, a validating certificate (a reader root certificate) specific to a reader device or set of reader devices is provided to the server, which stores the reader root certificate in a database of trusted reader devices. As explained herein, a reader root certificate may be shared by many different reader devices, and therefore this reader root certificate may validate any one of them. For example, a particular vendor of a terminal used for security screening at an airport may provide a reader root certificate for all of its terminals, or for a certain make/model of terminal, and as a result each corresponding terminal device would use that reader root certificate in a subsequent request for a user's identifying information. This approach is more secure than, for example, merely relying on an external device's device ID, which is much more easily spoofed. In other examples, a reader root certificate may pertain to a particular computing device (e.g., a server device), which provides that reader root certificate in a subsequent request for a user's identifying information.

The backend server communicates with a trusted application on the mobile device, and provides reader root certificates to the mobile device over a secured communication channel. For example, the server may provide reader root certificates to the mobile device each time the user provisions a new identification credential (e.g., a driver's license, a passport, etc.) to their secured hardware location. As another example, the server may refresh reader root certificates at a particular timeframe, e.g., every 30 days, and as a result, the mobile device receives certificates that were uploaded to the server's trusted reader database since the server last provided reader root certificates to the mobile deice.

Step 120 of the example method of FIG. 1 includes receiving, at the mobile device of a user, a request from an external device to provide information regarding the user's identity. As explained above, the information regarding the user's identity is stored in a secure hardware portion of the mobile device, and this information is only accessible by a trusted application/trusted processor on the mobile device. The request can be made over any close-range communication channel, such as an NFC channel or a Bluetooth channel. In particular embodiments, the mobile device may initiate the communication, e.g., through an NFC scan, through a QR-code scan, by requesting a URL, etc.

For online, remote transactions, the relying party (RP) would enroll into a Wallet Portal and save a trusted public key. Then, when an on-device application or web-based client (e.g., a web browser) makes a request, the initial session establishment message will contain information signed by the RP's private key corresponding to the public key stored in Wallet Portal. The device will therefore recognize that the request is coming from a trusted application.

To establish a communication session, an in-person external device may generate an ephemeral keypair. A request from an external device may include requests to establish a communication session for transmitting information regarding the user's identity or may include an explicit request for the information itself, e.g., once a communication session is established. For example, an in-person reader device may transmit a session establishment request, which includes a header signed by the reader root certificate.

Step 130 of the example method of FIG. 1 includes receiving, at the mobile device of the user, a X509 based certificate chain from the requesting external device. For example, the certificate chain may be supplied in a header of a session establishment message. The mobile device receives the external device's session establishment message and, and in step 140 of the example method of FIG. 1, evaluates the certificate chain from the requesting external device relative to the one or more trusted reader root certificates that the mobile device obtained from the server device.

Step 150 of the example method of FIG. 1 includes, in response to a determination that the received certificate chain matches one of the trusted reader root certificates, then granting, to a trusted application on the mobile device of the user, access to the secure information regarding the user's identity. As explained above, the external device (or any other device or process, even those running on the mobile device) cannot actually access the information in the secure hardware portion of the mobile device; only a trusted application and trusted hardware with particular access privileges can do so, and in particular embodiments, after user authentication on the specific hardware device. Therefore, once a request is authorized using above procedures, the trusted application on the mobile device may access the user's identifying information on the mobile device and generate the response payload.

Figure 2:
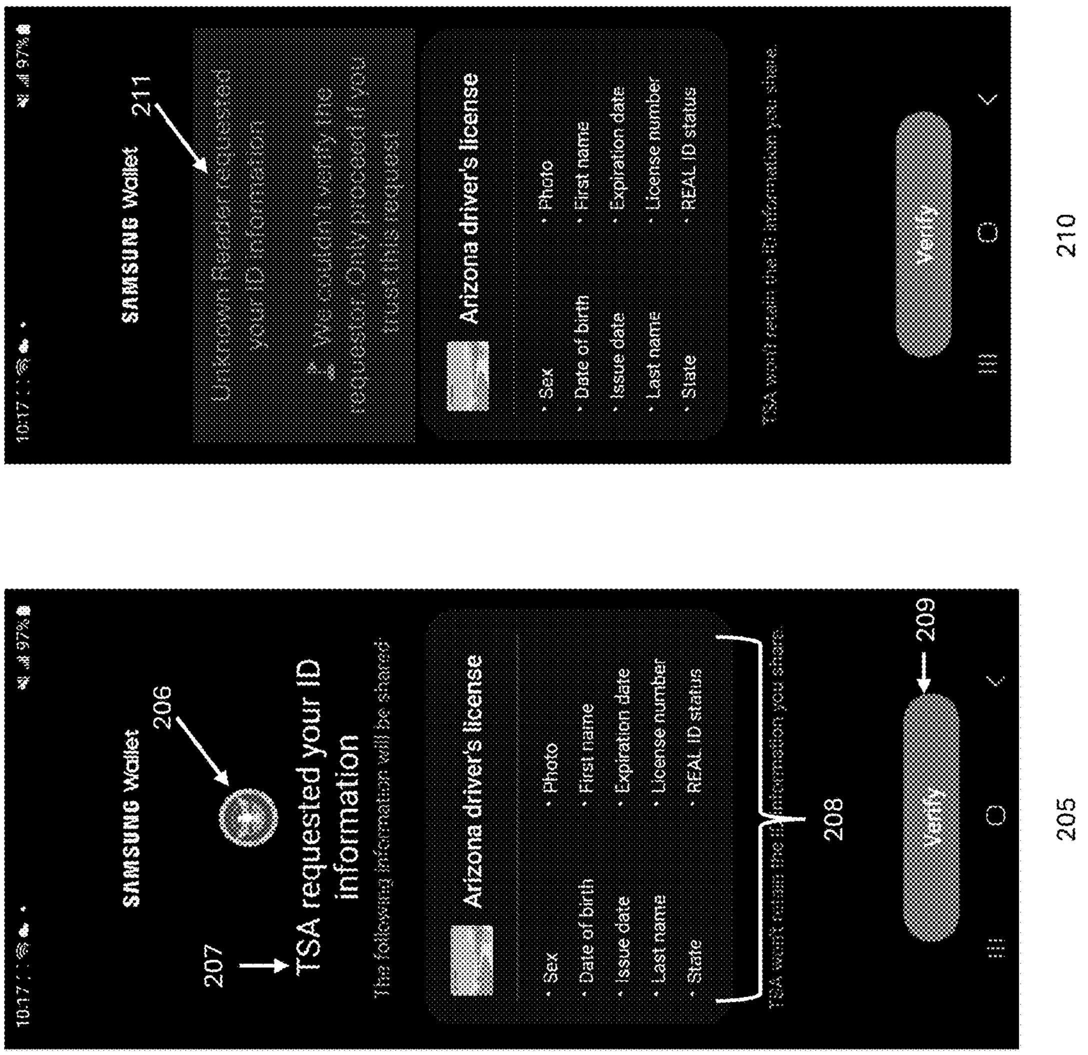
FIG. 2 illustrates example user interfaces that are based on whether an external device provides a valid certificate.

In particular embodiments, once authorized, a request from an external device may be fulfilled automatically, i.e., the mobile device, via the trusted application, may obtain and transmit the user's score identifying information to the external device without further user input. For instance, this disclosure describes below an example in which requests can be automatically fulfilled based on contextual determinations. Other embodiments provide a UI to the user so that the user can decide whether to proceed with an authenticated request (i.e., a request in which the certificate chain supplied by the external reader device matches one stored by the mobile device) or to proceed with a request that is not authenticated (i.e., because the certificate supplied by the external reader device does not match one stored by the mobile device). FIG. 2 illustrates example UIs that are based on whether an external device provides a valid certificate. Each UI may be presented within a trusted application on the mobile device. For example, UI 205 includes an identification 206 (a logo) and an identification 207 (a text description) of the identity of the entity associated with the requesting external device. UI 205 includes an identification 208 of the specific information requested by the external device, as well as an interactive element 209 that allows the user to permit the request—in this example, the user can deny the request by, e.g., an interactive element, by navigating away from UI 205, etc. In contrast, UI 210 provides an explanation 211 that the request comes from an unknown external device, and that the identity of the requestor cannot be identified. In particular embodiments, automatic credential fulfillment may be performed primarily when the requesting device is physically present with the user, and online, remote transactions may primarily require a user authorization for each request.

In particular embodiments, a request for a user's identifying information may include a subset of the identifying information stored in the secure hardware portion of the mobile device. For example, a user attempting to buy an alcoholic product may need to verify only their legal age; while a user attempting to transfer money from a bank account may need to verify their name, address, and date of birth; while yet another user attempting to rent a car may need to verify their name, age, and license ID number and expiration date. Therefore, rather than transmitting the user's entire credential (e.g., the entire stored ID, as if physically presenting the ID to the requestor or transmitting a picture of the front/back of the ID), particular embodiments may identify the specific information being requested and then transmit only that information to the requestor. This approach limits the data that each requestor receives, increasing the security of user information, e.g., in case of a data breach at the requesting entity. For instance, a user attempting to buy an alcoholic drink need not provide their entire ID information (e.g., license ID number, home address, etc.), and therefore this information would not be at issue if the transmitted data was subject to unauthorized access.

In particular embodiments, the mobile device may determine and send a trust score to the requesting external device before completing the exchange of information and/or the overall transaction for which the information is sought. Here, the trust score is to ensure that the mobile-device side of the transaction is authentic, i.e., that the mobile device is not stolen or hacked, or the user account holding the digital credential is valid, or that the device is rooted by fraudsters/hackers to gain access to system level functions on the device. Upon receiving the trust score, the external device can determine whether to proceed with the transaction, whether to deny the transaction, or whether to take additional authentication measures. In particular embodiments, a trusted application (e.g., a wallet application) may also act upon the trust score, e.g., by denying a transaction or by temporarily locking the user's mobile device or the trusted application, in order to prevent unauthorized transactions.

A trust score may depend on the mobile device's current context. For example, a trust score may be based on the mobile device's current location. If the current location corresponds to a known location of the user, or to a location that the user frequently appears, then that suggests the transaction is relatively more trustworthy. Another example context is whether the mobile device has been unlocked recently and/or the duration with which the identifying information has been provisioned on the mobile device. For instance, a device that has recently been unlocked several times with a user's biometric data indicates a relatively more trustworthy transaction, as does a relatively longer-term provisioning of credentials. Other examples of context include a user's involvement with their device or trusted application (e.g., whether the device is new or is a device which is 6 months old), device rooted status, attestation status, trusted-application account usage history, network connectivity status, etc.

In particular embodiments, trust scores may take on more importance in offline or other remote transactions in which there is no in-person review or oversight. For instance, during an in-person or offline transaction, a mobile device may provide a low trust score, but such transactions often have a human review element (e.g., a person can see the user presenting the mobile device) or an automated review element (e.g., a face scanner can scan the user's face and compare the in-person scan to an image of the user's face on the ID). In contrast, remote or online transactions are more difficult to verify, and therefore the trust score may take on a more important role in the transaction, in that the third-party associated with the external device may take relatively more actions based the trust score.

A mobile device may run low on battery, and at some point, the battery level may become so low that the device powers off many system components, including the device's display and the processors that execute the operating system on the mobile device. In this state, the device may appear to be completely inoperative, although it may have some residual battery power left; i.e., the powering-off process described above usually occurs before the device has absolutely no battery level left.

A device that is in the low-battery level described above may present difficulties for the user regarding the user's need to validate their identity. For example, suppose a user is at the airport and needs to validate their identity to security personnel. If the user's identity is stored on the mobile device, then the low-power level described above prevents the user from validating their identity, which may lead to serious problems (e.g., missing their flight and experiencing any related personal or professional consequences as a result). However, in order to avoid this problem and make the device operable for the at-times critical purpose of providing in-person validation of the user's identity, the device may periodically power on a short-range communication module of the mobile device while the device is in the low-battery level. For example, a short-range communication module may include an NFC module, a Bluetooth module, or the like.

The short-range communication module may be powered on, e.g., every few seconds or every few milliseconds. A requesting reader device continuously transmits an interrogation to look for responding devices around it. If the mobile device's short-range communication module detects an interrogation signal, it then transmits a response to the reader device. Moreover, the mobile device may then power on a trusted processor of the mobile device that can access the secure hardware location of the mobile device on which the user's identifying information is securely stored. In particular embodiments, the trusted processor and associated hardware (e.g., buffers and memory caches) may be physically separate from the mobile device's main processors that, e.g., execute the mobile device's operating system and related applications, and therefore the trusted processor may be powered on without having to power the full processing capabilities of the mobile device, which a low battery level may not support.

In addition, the mobile device may power on a biometric sensor that corresponds to a biometric authentication signal that authenticates the user and authorizes access to the secure information identifying the user. For example, once a communication session is established between the mobile device and the requesting device, then the requesting device may transmit its request for identifying information, and in response the mobile device may power on its trusted processor and its biometric sensor(s) related to authentication. In particular embodiments, the device may also power on an identification to the user that the sensor is active, e.g., an LED light associated with a fingerprint reader on the mobile device may flash to alert the user to the fact that the sensor is now receiving power. In particular embodiments, the communication module, trusted processor, and biometric sensor(s) may be powered on without powering on any display of the mobile device, and therefore the user may not be aware of the state of the external device's request absent some identification (e.g., an LED light) that the biometric sensor is active and ready to receive input from the user.

If the user authenticates their biometric(s) through the biometric sensor(s), then the trusted processor may obtain the requested information from the secure location on the mobile device and transmit the information, via the short-range communication module, to the requesting reader device. The mobile device may then power down the trusted processor and biometric sensors, and may return the short-range communication module to a duty-cycled state, in which power is only periodically supplied. Thus, using the techniques described herein, a user may authenticate their identity via their mobile device to a requesting device that is in the user's vicinity of, even when the mobile device is in such as low-power state that its normal operations cannot be performed.

In particular embodiments, in certain circumstances a request from an external device can be automatically approved by the mobile device, so that the user does not have to provide further input (e.g., via UI 205 in the example of FIG. 2) to the mobile device. For instance, if a user has granted a request for particular information to a particular credential (e.g., a particular reader root certificate) from a particular mobile device, then subsequent requests involving that information, the credential, and the mobile device may be automatically granted. Here, the same credential may be used by different physical external devices, and therefore a user does not necessarily need to engage in a transaction with the same physical device to automatically grant a request. For example, a user may grant a request for identifying information to a scanner at an airport security checkpoint. If the user later returns to that checkpoint, then any device bearing the same certificate chain or identifiers can submit a request that may be automatically granted by the mobile device.

In particular embodiments, the current context of a mobile device may be used along with a previous context of the mobile device during the time the user granted a previous request to determine whether to automatically grant a current request. For example, a location of the mobile device during a previously granted access request may be compared to the device's current location, and if two locations match and the requesting device provides the same certificate that accompanied the previously granted request, then request may be automatically granted. Other examples of current context include whether the mobile device has recently been unlocked, a time of day (e.g., when accessing a particular secured area for a business), a user's involvement with their device or trusted application (e.g., whether the device is new or is a device which is 6 months old), device rooted status, attestation status, trusted-application account usage history, network connectivity status, and so forth.

Figure 3:
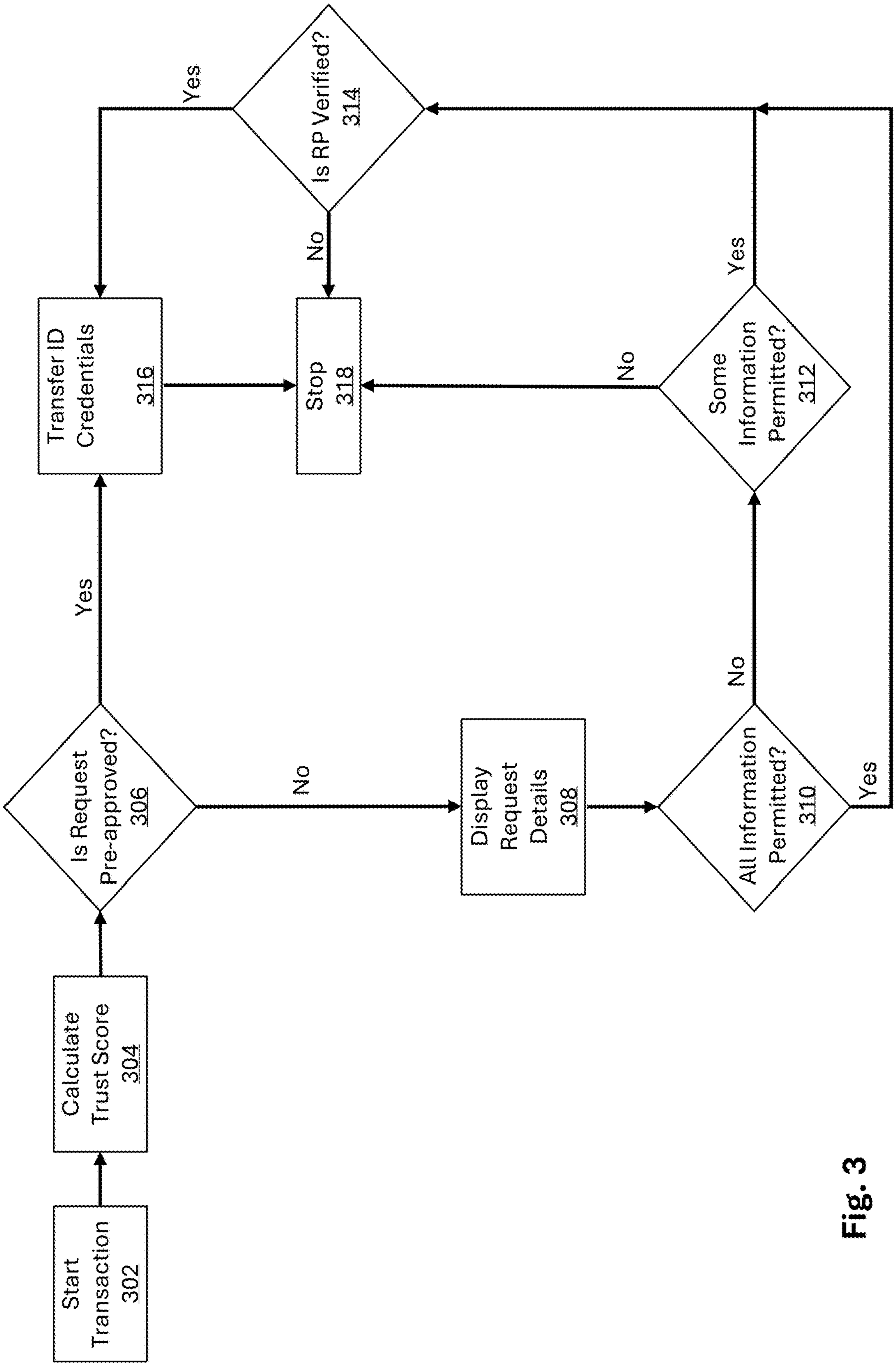
FIG. 3. illustrates the flow of an example transaction involving a request for a user's secure identifying information.

FIG. 3 illustrates the flow of an example transaction that illustrates several aspects of the techniques described above, although this disclosure contemplates that not all of the techniques described in FIG. 3 may be used by each particular mobile device or in every particular transaction. In FIG. 3, a transaction is started at step 302, for example via a request over the internet or in person. As explained above, in particular embodiments, the mobile device may initiate the transaction, or an external device may initiate the transaction. In the example of FIG. 3, at step 304 the mobile device determines its current contexts (e.g., location, time since last unlock, etc.), and step 304 may be performed substantially continuously, so that the mobile device has the most up-to-date context information. At step 306, the mobile device determines whether the request is pre-approved, e.g., whether the request includes a previously approved certificate and the current contexts permit pre-approval. If yes, then in step 316, the identifying information of the user is transferred to the external device, either online or over a short-range communication protocol. If the request is not pre-approved, then in step 308 of FIG. 3 the request and corresponding details (e.g., as in the example UIs of FIG. 2) are shown to the user on a display of the mobile device. The user may approve the request in full, or may approve the request to share certain information or decline the request.

In step 310, the user or the mobile device determines whether the external device will receive all the identifying information (e.g., based on the information requested and on the permissions previously granted or currently granted by the user of the mobile device). For instance, the user may decide whether to approve the request in full, i.e., whether to grant access to all the information requested. If yes, then in the example of FIG. 3, step 314 includes determining whether the requesting device (or relying party) is a verified device that is approved to receive identifying information. If the result of step 314 is no, then the transaction ends at step 318 without a transfer of identifying information. If the external device is not granted access to all requested information in step 310, then step 312 determines whether the request should be at least partially fulfilled, i.e., should be fulfilled with at least some information. For instance, a user may decline to grant access to all requested information but may grant access to some identifying information. If the user does approve access to some of the requested information, then step 314 may be performed; otherwise, the transaction ends at step 318. If the checks of steps 310 or 312 and 314 are satisfied, then the requesting external device receives the requested information in step 316.

Figure 4:
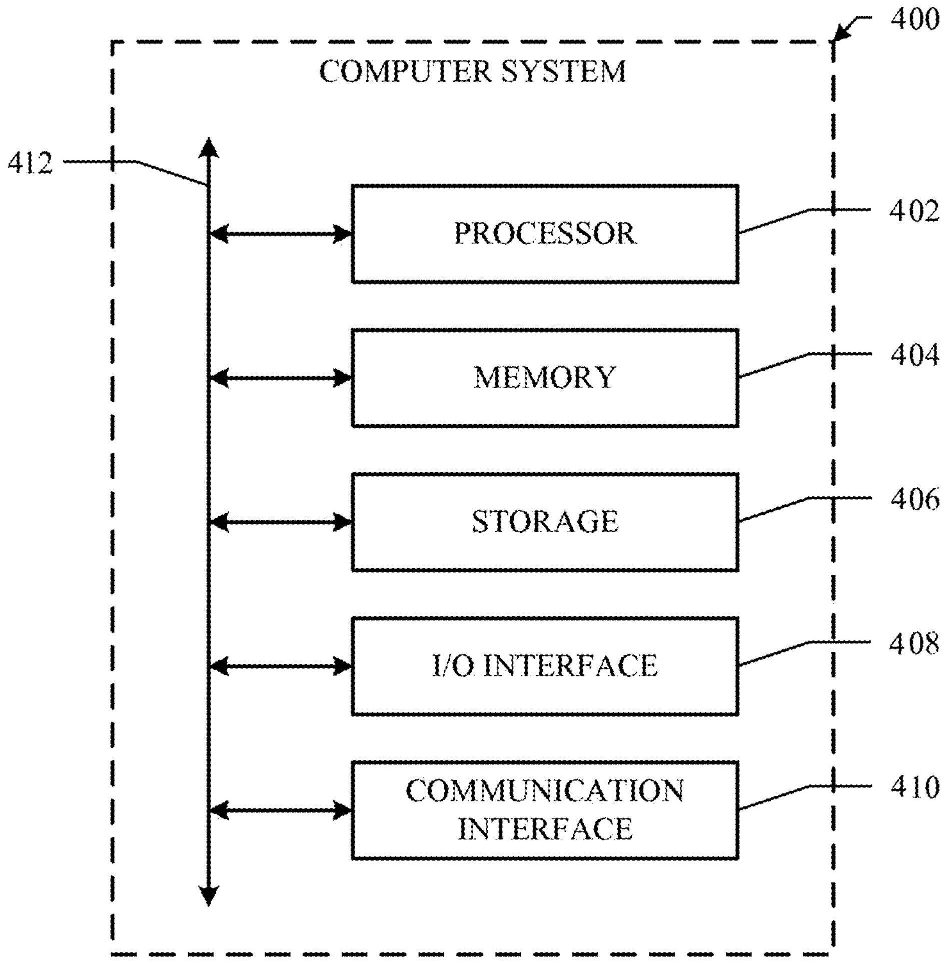
FIG. 4 illustrates an example computing system.

FIG. 4 illustrates an example general-purpose computer system 400. FIG. 4 illustrates the main processors and memory in general-purpose computer system 400 and not the secured hardware portions described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

receiving, at a mobile device of a user and from a server device comprising a database of trusted reader devices, one or more trusted reader root certificates, each trusted reader root certificate pertaining to one or more particular trusted reader devices that are external to and separate from the mobile device of the user;

receiving, at the mobile device, a request from an external device to provide information regarding the user's identity to the external device, wherein the information regarding the user's identity is stored in a secure hardware portion of the mobile device;

receiving, at the mobile device, a certificate chain from the requesting external device, wherein the certificate chain securely identifies the requesting external device;

evaluating the received certificate chain from the requesting external device relative to the one or more trusted reader root certificates on the mobile device; and in response to a determination that the received certificate chain that securely identifies the requesting external device matches one of the one or more trusted reader root certificates, then granting, to a trusted application on the mobile device, access to the information regarding the user's identity stored in the secure hardware portion of the mobile device.

2. The method of claim 1, further comprising presenting, on a display of the mobile device, an identity of the requesting external device.

3. The method of claim 1, further comprising, in response to a determination that the received certificate chain does not match any of the one or more trusted reader root certificates, then presenting a user interface (UI) on a display of the mobile device comprising an interactive element that denies or allows the request from the external device.

4. The method of claim 3, wherein the user interface (UI) further comprises an explanation that the identity of the requesting external device cannot be verified by the mobile device.

5. The method of claim 4, wherein the user interface (UI) further comprises an identification of specific information requested by the requesting external device.

6. The method of claim 1, further comprising periodically requesting any updated reader root certificates from the server device.

7. The method of claim 1, further comprising:

determining, by the mobile device, one or more current contexts of the mobile device;

determining, based on the one or more current contexts, a trust score associated with the mobile device; and providing, to the requesting external device, the trust score.

8. The method of claim 7, wherein the one or more current contexts comprise one or more of: a current location of the mobile device, a time since the mobile device was last unlocked, or a duration of time for which the information regarding the user's identity has been provisioned on the mobile device.

9. The method of claim 1, further comprising, in response to a determination that a battery level of the mobile device has fallen below a predetermined critical level, then:

powering off a main display of the mobile device;

periodically powering a short-range communication module of the mobile device;

in response to a communication between a reader device and the short-range communication module, then:

temporarily powering on a trusted processor of the mobile device that is granted access to the secure hardware portion; and temporarily powering on a biometric sensor of the mobile device.

10. The method of claim 9, wherein the trusted processor is distinct from a main processor of the mobile device that is used to run an operating system on the mobile device.

11. The method of claim 9, further comprising:

receiving a biometric input to the biometric sensor;

validating the biometric input to an authorized biometric input of the user; and providing, to the reader device, at least some of the information regarding the user's identity.

12. The method of claim 1, further comprising:

accessing an identifying certificate from the requesting external device;

determining whether the mobile device has previously provided at least some of the information regarding the user's identity to a device having the identifying certificate;

in response to an affirmative determination, then:

determining one or more current contexts of the mobile device; and automatically granting, based on the one or more current contexts, the request from the requesting external device.

13. The method of claim 12, wherein the one or more current contexts comprise a location of the mobile device.

14. The method of claim 12, wherein automatically granting the request comprises granting the request without activating a display of the mobile device.

15. The method of claim 12, further comprising receiving, from the user, authorization to automatically grant requests from a device that provides the identifying certificate.

16. The method of claim 1, further comprising:

determining specific information sought in the request from the external device;

accessing, by the trusted application, only the specific information from the information regarding the user's identity that is stored in a secure hardware portion of the mobile device; and providing, to the external device, only the specific information.

17. An apparatus comprising: one or more non-transitory computer readable storage media storing instructions; and one or more processors coupled to the one or more non-transitory computer readable storage media and operable to execute the instructions to:

access, on a mobile device of a user, a request from an external device to provide information regarding the user's identity to the external device, wherein the information regarding the user's identity is stored in a secure hardware portion of the mobile device;

access, on the mobile device, one or more trusted reader root certificates, each trusted reader root certificate (1) having been received from a server device comprising a database of trusted reader devices and (2) pertaining to one or more particular trusted reader devices that are external to and separate from the mobile device of the user;

access, on the mobile device, a certificate chain received from the requesting external device, wherein the certificate chain securely identifies the requesting external device;

evaluate the received certificate chain from the requesting external device relative to the one or more trusted reader root certificates on the mobile device; and in response to a determination that the received certificate chain that securely identifies the requesting external device matches one of the one or more trusted reader root certificates, then grant, to a trusted application on the mobile device, access to the information regarding the user's identity stored in the secure hardware portion of the mobile device.

18. One or more non-transitory computer readable storage media storing instructions that are operable when executed to:

access, on a mobile device of a user, a request from an external device to provide information regarding the user's identity to the external device, wherein the information regarding the user's identity is stored in a secure hardware portion of the mobile device;

access, on the mobile device, one or more trusted reader root certificates, each trusted reader root certificate (1) having been received from a server device comprising a database of trusted reader devices and (2) pertaining to one or more particular trusted reader devices that are external to and separate from the mobile device of the user;

access, on the mobile device, a certificate chain received from the requesting external device, wherein the certificate chain securely identifies the requesting external device;

evaluate the received certificate chain from the requesting external device relative to the one or more trusted reader root certificates on the mobile device; and in response to a determination that the received certificate chain that securely identifies the requesting external device matches one of the one or more trusted reader root certificates, then grant, to a trusted application on the mobile device, access to the information regarding the user's identity stored in the secure hardware portion of the mobile device.

19. The media of claim 18, further comprising instructions that are operable when executed to present, on a display of the mobile device, an identity of the requesting external device.

20. The media of claim 18, further comprising instructions that are operable when executed to, in response to a determination that the received certificate chain does not match any of the one or more trusted reader root certificates, then present a user interface (UI) on a display of the mobile device comprising an interactive element that denies or allows the request from the external device.

* * * * *